(12) United States Patent
Mizutani (10) Patent No.: US 8,325,376 B2
(45) Date of Patent: Dec. 4, 2012

(54) IMAGE-FORMING DEVICE HAVING INDEX PRINTING FUNCTION

(75) Inventor: Norio Mizutani, Mie-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 563 days.

(21) Appl. No.: 12/561,037

(22) Filed: Sep. 16, 2009

(65) Prior Publication Data

US 2010/0079808 A1    Apr. 1, 2010

(30) Foreign Application Priority Data

Sep. 30, 2008 (JP) ................................. 2008-254791
Aug. 6, 2009 (JP) ................................. 2009-183187

(51) Int. Cl.
*G06F 15/00* (2006.01)

(52) U.S. Cl. ....................................... 358/1.16
(58) Field of Classification Search ................... 358/1.16
See application file for complete search history.

(56) References Cited

U.S. PATENT DOCUMENTS

| | | | |
|---|---|---|---|
| 6,594,034 B1 * | 7/2003 | Bloomquist et al. | 358/1.18 |
| 7,019,864 B2 * | 3/2006 | Delhoune et al. | 358/1.18 |
| 2008/0024812 A1 | 1/2008 | Miyazaki et al. | |

FOREIGN PATENT DOCUMENTS

| | | |
|---|---|---|
| JP | 06-162008 | 6/1994 |
| JP | 10-337934 | 12/1998 |
| JP | 2003-345540 | 12/2003 |
| JP | 2008-30221 | 2/2008 |

* cited by examiner

*Primary Examiner* — Saeid Ebrahimi Dehkordy
(74) *Attorney, Agent, or Firm* — Banner & Witcoff, Ltd.

(57) ABSTRACT

An image-forming device performs a conversion process, creates page data, causes performance of index printing, stores a page data creatable range delimiter and performs a replacement process. The conversion process converts sets of print data, which are of differing formats into intermediate data of a common format. The creating step creates page data from the intermediate data in parallel with the conversion process. A printing unit performs index printing based on the created page data. A storing unit stores a page data creatable range delimiter for the intermediate data by which the creating step can create the page data from the intermediate data. The replacement process replacing the intermediate data positioned after the page data creatable range delimiter in the print data with substitute data when an error occurs in the print data during the conversion process.

21 Claims, 11 Drawing Sheets

IMAGE-FORMING DEVICE HAVING INDEX PRINTING FUNCTION

CROSS REFERENCE TO RELATED APPLICATION

This application claims priority from Japanese Patent Applications No. 2008-254791 filed Sep. 30, 2008 and No. 2009-183187 filed Aug. 6, 2009. The entire content of each of these priority applications is incorporated herein by reference.

TECHNICAL FIELD

The present invention relates to an image-forming device, and particularly to an image-forming device having an index printing function.

BACKGROUND

There has been known a technology for continuing a printing process on a printer, when the printer encounters data in files being printed that cannot be developed or rasterized, by replacing with substitute data the data that cannot be developed.

Index printing involves printing out print data from a plurality of files as a single image composed of a reduced image (or thumbnail image) corresponding to each file. When the plurality of files to be printed in an index printing operation include Page Description Language (PDL) data of different formats, it is impossible to create page data by launching a plurality of PDL rasterizers corresponding to the plurality of PDL formats. So, a method has been developed for using an enhanced PDL rasterizer capable of processing all PDL data together. However, this method requires much effort for continually updating the enhanced PDL rasterizer each time a new PDL format not supported by the current PDL rasterizer emerges. Therefore, another method of index printing has been developed in which data of various PDL formats is converted into a common intermediate language (intermediate data) using a plurality of PDL rasterizers supporting these formats, and subsequently rasterizing the intermediate data.

SUMMARY

An object of the present invention is to provide an improved image-forming device that can perform an index printing reliably and within a short period of time even when an error occurs.

In order to attain the above and other objects, the invention provides an image-forming device including: a converting unit; a creating unit; a storing unit; and a replacing unit. The converting unit performs a conversion process to convert a plurality of sets of print data, which are of differing formats from one another, into intermediate data of a common format, the converting unit converting each set of print data into a corresponding set of intermediate data. The creating unit creates page data from the intermediate data in parallel with the conversion process. The printing unit performs an index printing operation based on page data created by the creating unit. The storing unit stores at least one page data creatable range delimiter for the intermediate data by which the creating unit can create the page data from the intermediate data, the storing unit storing one page data creatable range delimiter after the converting unit converts at least a part of one set of print data of one format into a set of intermediate data, from which page data is creatable. The replacing unit is configured so as to be capable of performing a replacement process to replace at least the intermediate data positioned after the page data creatable range delimiter in the print data with substitute data when an error occurs in the print data during the conversion process.

DETAILED DESCRIPTION

An image-forming device according to an embodiment of the invention will be described while referring to the accompanying drawings wherein like parts and components are designated by the same reference numerals to avoid duplicating description.

A printer 10 according to the present embodiment has a PC print function and a direct print function. The PC print function includes receiving print data from a host computer (not shown), and the like, and printing the data. The direct print function includes directly reading image data stored in external memory, such as USB memory 17, and printing the read image data.

Figure 1:
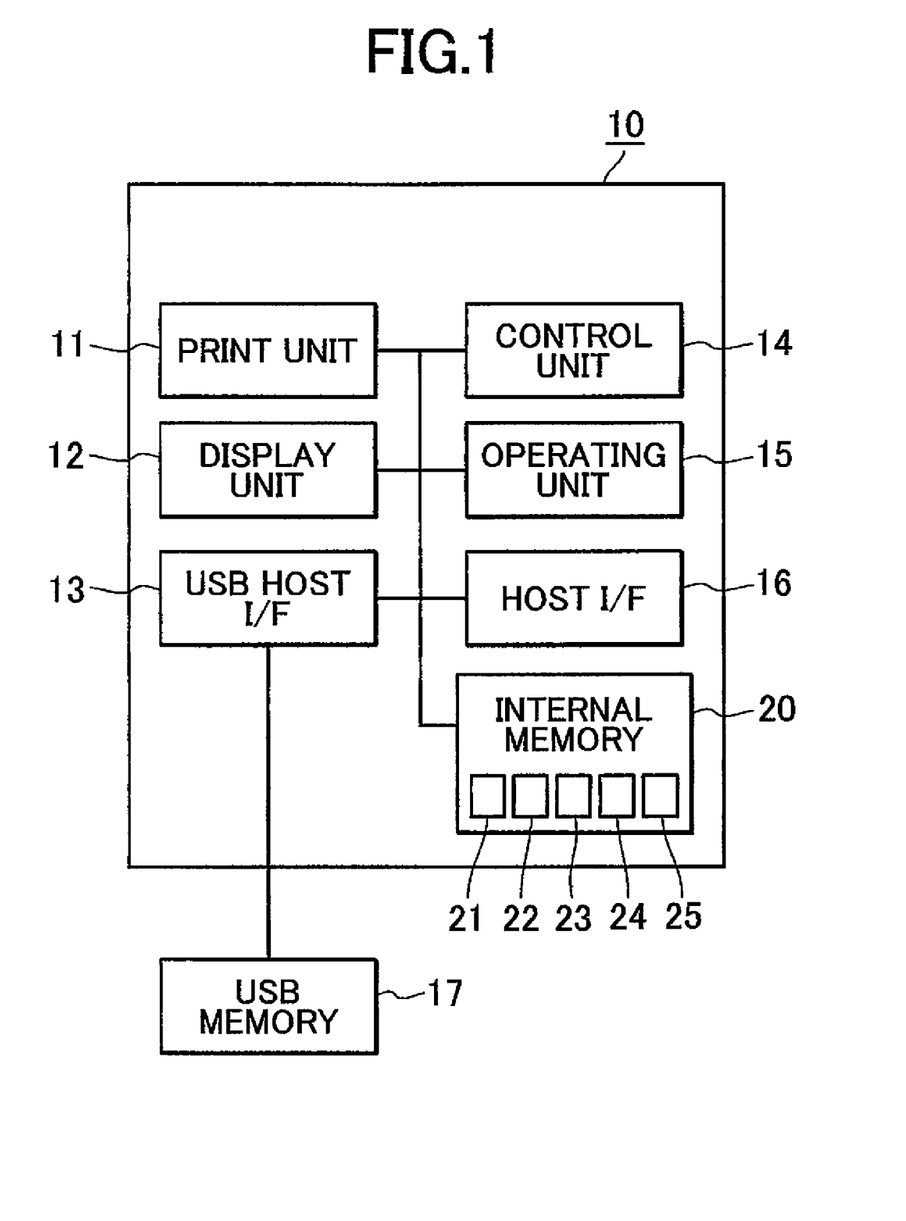
FIG. 1 is a schematic diagram illustrating a hardware configuration of a printer according to an embodiment of the present invention.

FIG. 1 is a schematic diagram showing the hardware configuration of the printer 10. The printer 10 has a print unit 11 for subjecting a sheet of paper 19 (shown in FIG. 8) to printing; a display unit 12; a USB host I/F 13; a control unit 14; an operating unit 15 operated by a user; a host I/F 16; and internal memory 20.

The internal memory 20 includes a ROM, a RAM, a hard disk, and the like. Substitute data, which will be described later, as well as programs for controlling the overall operation of the printer 10 are stored in the internal memory 20.

The internal memory 20 stores therein printing layout data 21. The internal memory 20 includes an intermediate code management table 22, a rasterizable position table 23, an intermediate code storage area 24, and a page memory 25.

The control unit 14 has a CPU and controls operation of the print unit 11 and operation of the display unit 12 in accordance with programs stored in the internal memory 20. Moreover, the printer 10 can establish data communication with the host computer by way of the host I/F 16. The USB memory 17 is removably attached to the printer 10, and information in the USB memory 17 (e.g. a plurality of sets of PDL data which are prepared in formats different from one another) is read into the control unit 14 by way of the USB host I/F 13. The host I/F 16 may be substituted with a network I/F for connecting the printer 10 with a LAN circuit and the Internet circuit.

Files of various formats are stored in the USB memory 17. A file including data of a format which is not supported and cannot be developed or rasterized by the printer 10 (e.g., sound data, motion picture data, data of joint photographic experts group (JPEG) 2000 format, and the like) can be present in the files. Further, a file including data which are corrupt and cannot be rasterized by the printer 10 can also be present in the files.

Figure 2:
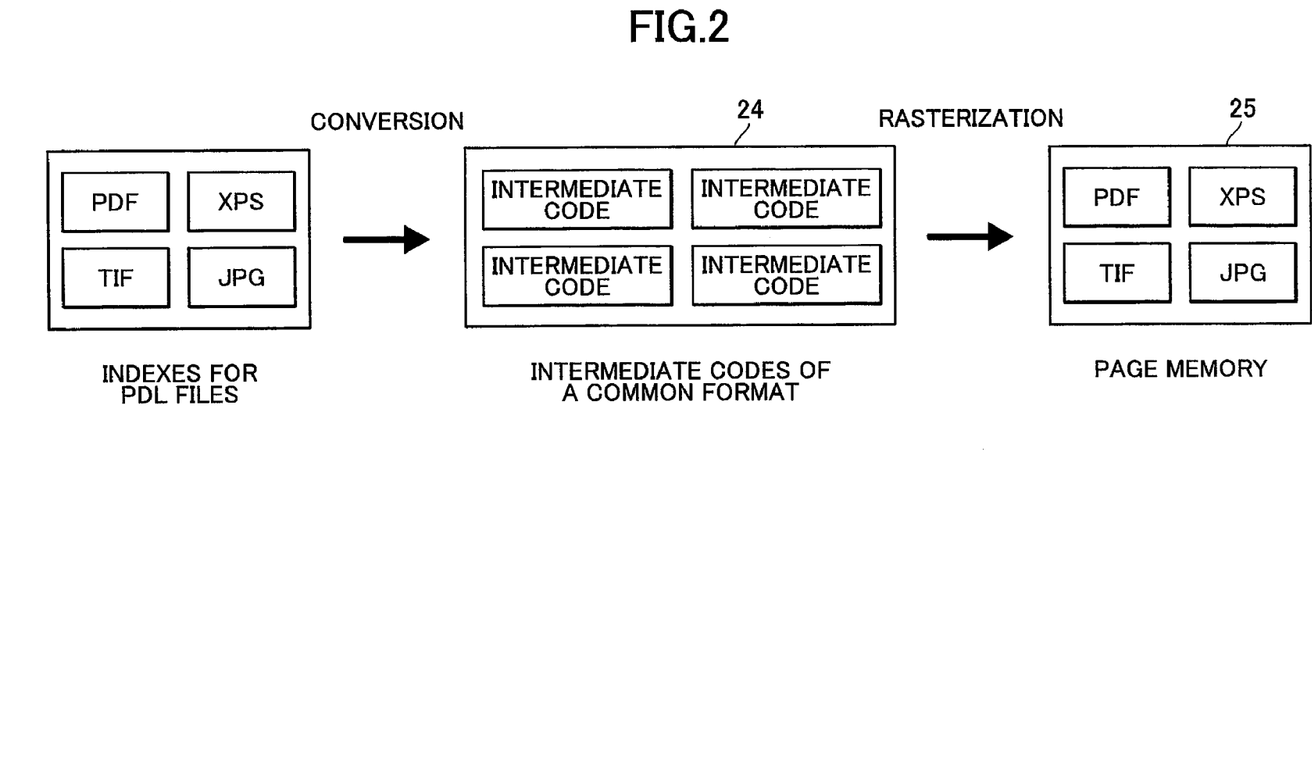
FIG. 2 is an explanatory diagram illustrating general steps in an index printing process according to the embodiment.
Figure 3:
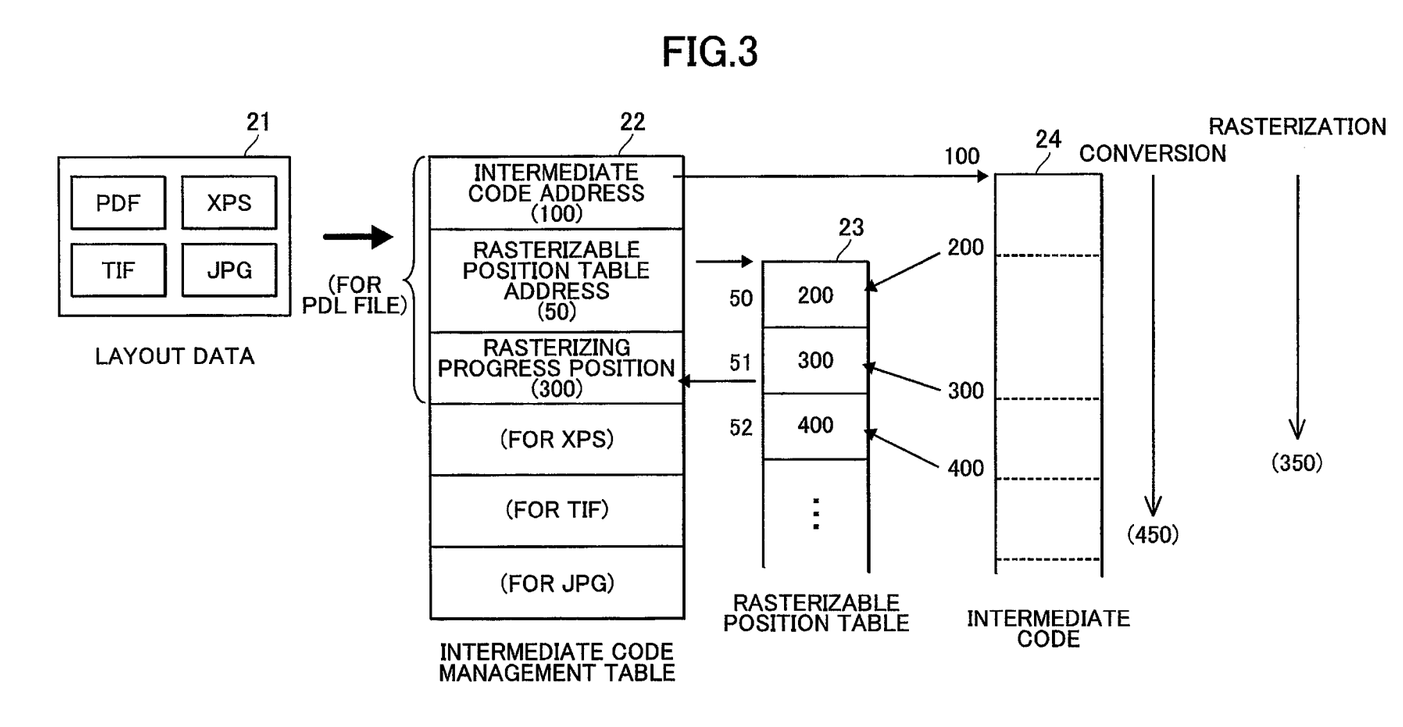
FIG. 3 is an explanatory diagram showing the data structure in an internal memory.

Next, an index printing process according to the embodiment will be described with reference to FIGS. 2 through 12. FIG. 2 is an explanatory diagram illustrating general steps in an index printing process according to the embodiment. FIG. 3 is an explanatory diagram showing the data structure in the internal memory 20.

As illustrated in FIG. 2, print data from a plurality of files having different formats are printed together on a single page in what is referred to as index printing. For the sake of description, this example of index printing in the embodiment involves printing four PDL files of different formats. The files are a file in the Portable Document Format (hereinafter simply referred to as a "PDF file"), a file in the Xml Paper Specification format (hereinafter simply referred to as an "XPS file"), a file in the Tag Image File format (hereinafter simply referred to as a "TIF file"), and a file in the Joint Photographic Experts Group format (hereinafter simply referred to as a "JPG file").

First, the control unit 14 converts the PDL files in each of the four formats to intermediate code of a common format. The intermediate code is stored in the intermediate code storage area 24 of the internal memory 20. Here, the common format for the intermediate code may be a specific PDL format.

Next, the control unit 14 rasterizes the intermediate code corresponding to each PDL file. Bitmap data produced through this rasterization process is stored in the page memory 25 of the internal memory 20.

As shown in FIG. 3, the intermediate code management table 22 stores, for each PDL file, an intermediate code address, a rasterizable position table address, and a rasterizing progress position.

Here, the intermediate code address indicates the top address of the intermediate code storage area 24. In this example, the intermediate code address for the PDF file is "100." The rasterizable position table address indicates the top address of the rasterizable position table 23. In this example, the rasterizable position table address (for the PDF file) is "50."

The rasterizable position table 23 is for storing end positions (addresses) of a plurality of portions in the intermediate code that can be rasterized. In the example of FIG. 3, the rasterizable position table 23 stores end addresses "200," "300," and "400" indicative of three portions of intermediate code that can be rasterized. In the embodiment, each PDL file is converted to intermediate code on the basis of commands included in the PDL file. Every time after intermediate data is generated for one command, the end address of the generated intermediate data is stored in the rasterizable position table 23 as page data creatable delimiter because the intermediate data for each command is one group of intermediate data, based on which page data can be created.

Further, the rasterizing progress position is an address in the intermediate code storage area 24 at which rasterization of intermediate data is complete and has a value corresponding to one of the rasterizable addresses stored in the rasterizable position table 23. Specifically, in a rasterization process performed parallel to the process for converting PDL files to intermediate code in the embodiment, the control unit 14 sequentially rasterizes prescribed quantities of intermediate code separated by the rasterizable addresses. In the example of FIG. 3, when the control unit 14 has produced intermediate code through the conversion process up to address "450" in the intermediate code storage area 24, the control unit 14 has rasterized the same intermediate code up to address "350" in the rasterization process. At this time, the address "300" for the same code is stored as the rasterizing progress position.

Next, the overall index printing process will be described with reference to the flowchart in FIG. 4. The control unit 14, and more specifically the CPU in the control unit 14, executes each step in the index printing process based on a program stored in ROM of the internal memory 20, for example. The control unit 14 begins the process shown in FIG. 4 when the user issues a command to perform the index printing function through prescribed operations on the operating unit 15 and to input configuration settings to be designated in relation to the index printing, such as a range of files or the like to be printed as an index print, for example.

Figure 4:
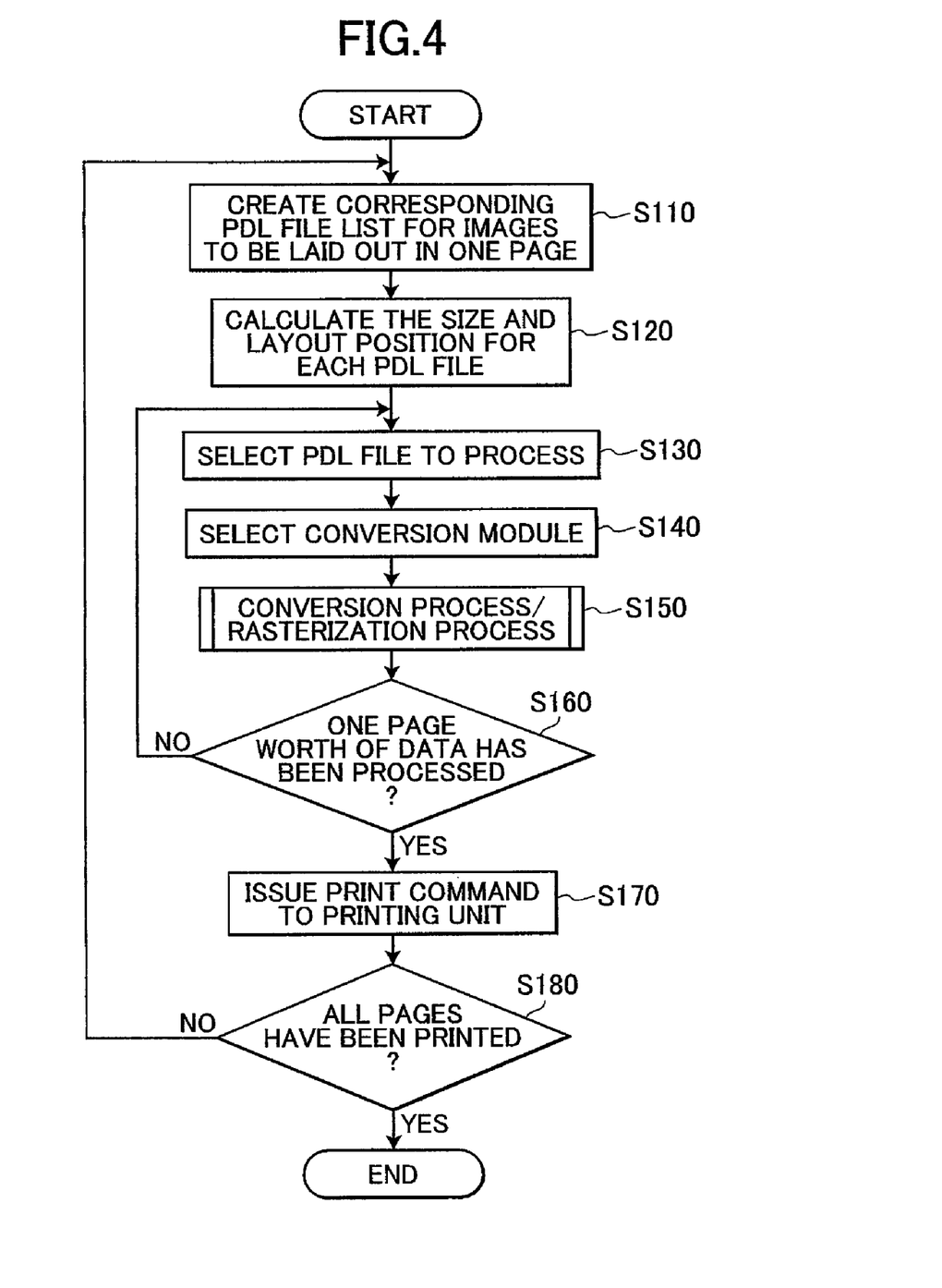
FIG. 4 is a flowchart showing an index printing process.

In S110 of FIG. 4, the control unit 14 creates a corresponding PDL file list for images to be laid out in an initial page according to the user's designated configuration settings related to index printing. In S120 the control unit 14 calculates the size and layout position for each PDL file based on the configuration settings and stores this data in the internal memory 20 as the printing layout data 21 (see FIG. 3).

In S130 the control unit 14 selects a PDL file to process. In this example, the control unit 14 first selects the PDF file from among the four PDL files in FIG. 3. In S140 the control unit 14 selects a conversion module for converting the PDF file, which was selected in S130, to a common intermediate code according to the type of the PDF file selected. In the embodiment, conversion modules corresponding to types of PDL files are stored in the internal memory 20 as programs (software).

In S150 the control unit 14 performs in parallel a conversion process (see FIG. 5) for converting the PDF file to the intermediate code according to the selected conversion module, and a rasterization process (see FIG. 7) for rasterizing the intermediate code using a rasterizer (software). After completing the conversion process and rasterization process for the PDF file, in S160 the control unit 14 determines whether one page worth of data has been processed. Since there are more PDL files to be processed for the initial page (S160: NO), the control unit 14 returns to S130 and selects the next PDL file to process.

After completing the conversion process and rasterization process for all PDL files on the initial page (S160: YES), in S170 the control unit 14 issues a print command to the printing unit 11 to perform an index print by printing the size-reduced images for the first page.

After completing the index print for the first page, in S180 the control unit 14 determines whether all pages have been printed. If the index printing operation has not been completed for all pages (S180: NO), the control unit 14 returns to S110 and repeats the above process for the next page. When the index printing operation has been completed for all pages (S180: YES), the control unit 14 ends the index printing process.

Figure 5:
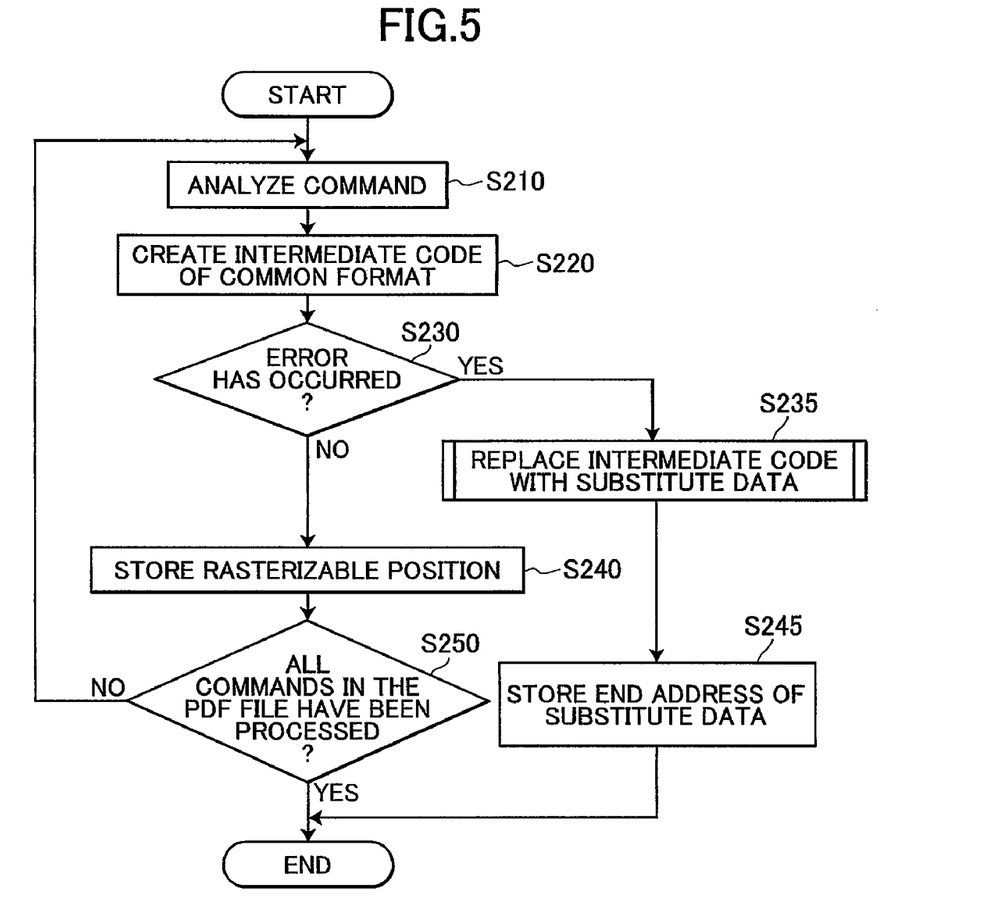
FIG. 5 is a flowchart illustrating steps in an intermediate code generation process (conversion process)
Figure 6:
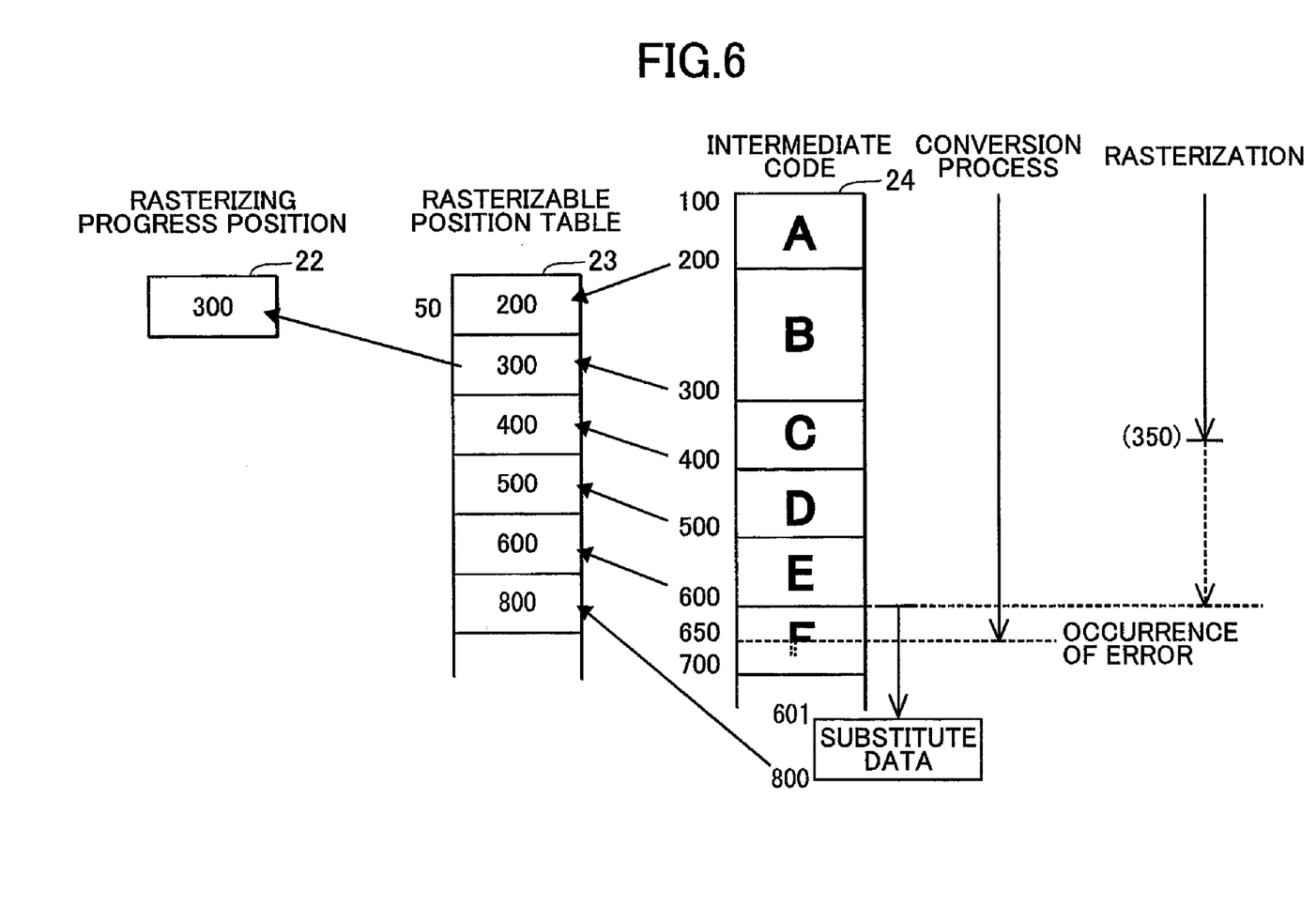
FIG. 6 is an explanatory diagram showing one example of the data structure in the internal memory when an error occurs during the intermediate code generation process.

Next, a conversion process (a process to generate the intermediate code described above; hereinafter also referred to as the "intermediate code generation process") and an error process performed when an error occurs during the intermediate code generation process will be described with reference to FIGS. 5 and 6. FIG. 5 is a flowchart illustrating steps in the intermediate code generation process. FIG. 6 is an explanatory diagram showing the data structure in the internal memory 20 when an error occurs during the intermediate code generation process. The control unit 14 executes the intermediate code generation process and the error process in S150 of FIG. 4.

In S210 at the beginning of the process in FIG. 5, the control unit 14 analyzes a command in the PDF file.

In S220 the control unit 14 creates intermediate code of a common format based on the analyzed command and sequentially stores the intermediate code in the intermediate code storage area 24 when the code is created. It is noted that the first time the control unit 14 performs the process of S220, the control unit 14 stores the top address of the intermediate code that the control unit 14 has just stored in the intermediate code storage area 24 as the intermediate code address in the intermediate code management table 22 (see FIG. 6) to show that intermediate code is stored in the intermediate code storage area 24.

In S230 the control unit 14 determines whether an error has occurred during the process to create intermediate code. If the process was performed normally (S230: NO), in S240 the control unit 14 stores the end position (address) of the intermediate code stored in the intermediate code storage area 24 in the rasterizable position table 23 as a rasterizable position. In this example, the control unit 14 stores the address "200" in the intermediate code storage area 24 as a rasterizable position (see FIG. 6).

In S250 the control unit 14 determines whether intermediate code has been produced based on all commands in the PDF file. When intermediate code has been produced for all commands in the PDF file (S250: YES), the control unit 14 ends the conversion process of FIG. 5. When intermediate code has not been produced for all commands in the PDF file (S250: NO), the control unit 14 returns to S210 and generates intermediate data based on the next command in the PDF file. If an error does not occur during data conversion, in S240 the control unit 14 stores the address "300" of the intermediate code storage area 24 in the rasterizable position table 23 as a rasterizable position (see FIG. 6). In this way, the control unit 14 performs the intermediate code generation process for each command and sequentially stores rasterizable addresses in the rasterizable position table 23.

In some cases, it may not be necessary to return to S210 and analyze the next command after reaching a NO determination in S250, such as when the settings specified by the commands (the font, color, and the like) are the same. In such cases, the control unit 14 may return to S220 instead.

However, if an error such as corrupted data is detected during the data conversion process (S230: YES), in S235 the control unit 14 replaces the intermediate code (data) produced from the PDF file with substitute data. The substitute data is pre-stored in the ROM of the internal memory 20, for example.

In the example shown in FIG. 6, data was converted normally up to address "600" in the intermediate code storage area 24, but an error occurred when producing intermediate data from the next command. At this time, intermediate code has been stored up to address "650" in the intermediate code storage area 24, for example, but the rasterizable address corresponding to the command that generated the error will not be stored in the rasterizable position table 23 due to the occurrence of the error. Hence, the last of the plurality of rasterizable addresses stored in the rasterizable position table 23 is "600."

At this time, the control unit 14 replaces the intermediate data beginning after address "600" in the intermediate code storage area 24 with substitute data, and specifically with intermediate code for the substitute data. In other words, the intermediate code for the PDF file stored in the intermediate code storage area 24 from at least the rasterizable address "600" is replaced with substitute data. More specifically, intermediate code for the PDF file stored in the intermediate code storage area 24 from address "601" to address "650" is replaced with intermediate code for the substitute data.

Thereafter, in S245, the end address of the intermediate code for the substitute data is stored in the rasterizable position table 23, and the process ends. For example, if the substitute data is stored in the intermediate code storage area 24 from address "601" to address "800", the end address of the substitute data "800" is stored in the rasterizable position table 23.

Next, the rasterization process for developing intermediate code into bitmap data will be described in detail with reference to the flowchart in FIG. 7. The control unit 14 executes the rasterization process in S150 of FIG. 4 at the same time as the intermediate code generation process.

Figure 7:
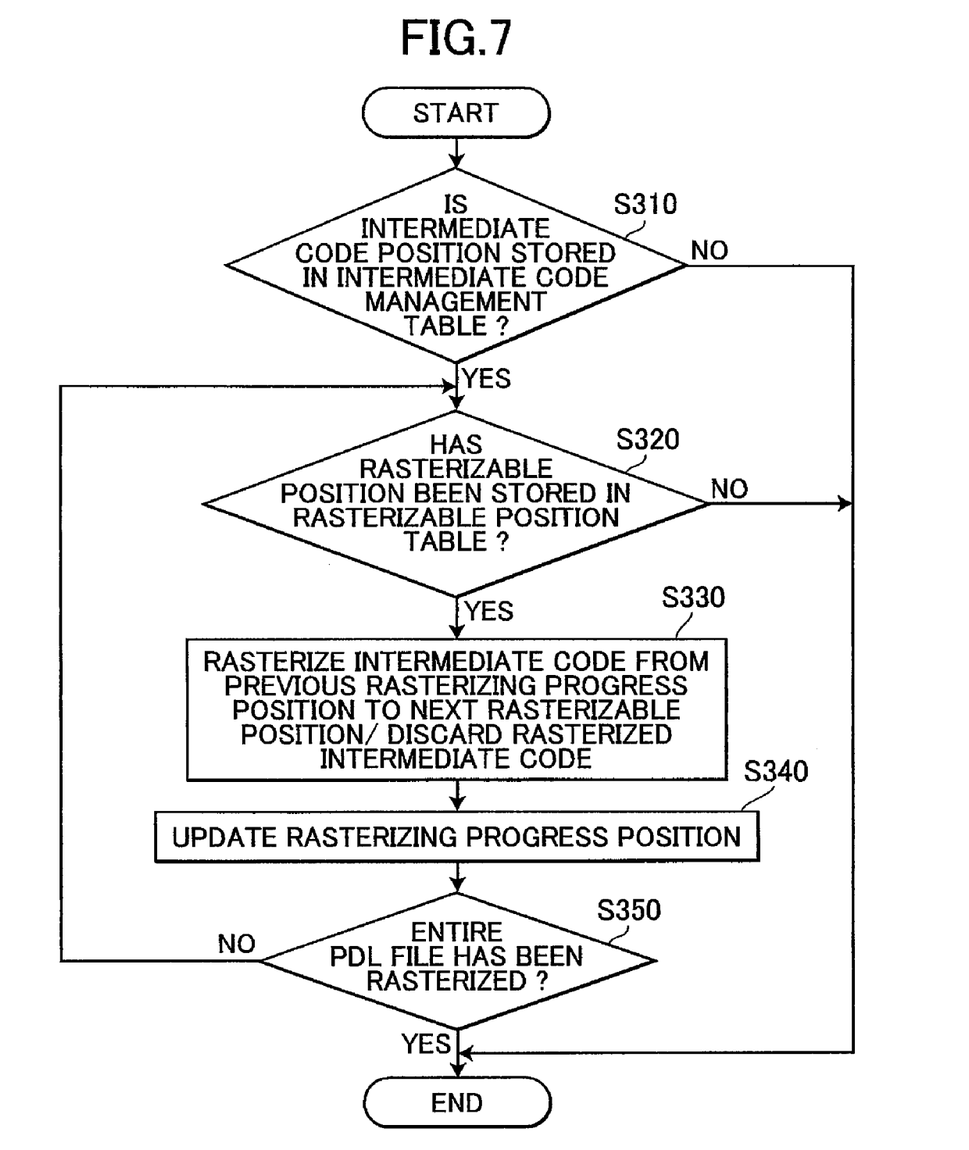
FIG. 7 is a flowchart showing the steps in a rasterization process.

In S310 at the beginning of the process in FIG. 7, the control unit 14 determines whether an intermediate code position (address) is stored in the intermediate code management table 22 (see FIG. 6). That is, the control unit 14 determines whether intermediate code has been stored in the intermediate code storage area 24 after an intermediate code generation process was requested for one of the PDL files. If no intermediate code address is stored in the intermediate code management table 22 (S310: NO), then the rasterization process is ended for the time being, since there is no data yet to be rasterized.

However, when intermediate code address is stored in the intermediate code management table 22 (S310: YES), in S320 the control unit 14 determines whether a rasterizable position (address) has already been stored in the rasterizable position table 23 (see FIG. 6). If a rasterizable position has not yet been stored in the rasterizable position table 23 (S320: NO), then the control unit 14 temporarily ends the rasterization process since the intermediate code conversion process for the first command has not yet been completed in the intermediate code generation process.

However, if a rasterizable position is stored in the rasterizable position table 23 (S320: YES), the control unit 14 advances to S330. The first time the control unit 14 performs the process in S330, the control unit 14 launches the rasterizer (software) and uses the rasterizer to rasterize the intermediate code from the intermediate code address (top address of the intermediate code) stored in the intermediate code management table 22 up to the first rasterizable position. Thereafter, when the control unit 14 returns to S330, the control unit 14 rasterizer intermediate code from the current rasterizing progress position to the next rasterizable position. The control unit 14 stores the rasterized data in the page memory 25 (see FIG. 2). Hence, the control unit 14 creates page data from intermediate data based on each rasterizable position.

The control unit 14 also discards (deletes) intermediate code from the intermediate code storage area 24 after the code has been rasterized. Therefore, the intermediate code storage area 24 need not be configured as a continuous region and can be made smaller, thereby reducing the required capacity of the internal memory 20. The intermediate code storage area 24 is made up from one or more areas that are distributed in the internal memory 20 and that change in their positions and sizes as the intermediate code is generated and stored in S220 and are discarded in S330. However, the process for discarding rasterized intermediate code may be omitted.

In S340 the control unit 14 sets the rasterizing progress position (address) to the rasterizable position (address), up to which rasterization has been executed during the current process. Thus, the control unit 14 updates the rasterizing progress position in the intermediate code management table 22.

In S350 the control unit 14 determines whether the entire PDL file (the PDF file in this case) has been rasterized. If rasterization is not complete for the entire PDL file (S350: NO), the control unit 14 returns to S320 and performs rasterization from the updated rasterizing progress position up to the next rasterizable position. The control unit 14 repeatedly performs the processes of S320-S350 until the entire PDF file has been rasterized. Once rasterization is complete for the PDF file being processed (S350: YES), the control unit 14 temporarily ends the rasterization process and returns to S160 of FIG. 4.

If, as described above, the intermediate code for the PDF file stored in the intermediate code storage area 24 from address "601" to address "650" has been replaced with the substitute data, that is, if the substitute data has been stored in the intermediate code storage area 24 from address "601" to address "800" in S235 and the end address "800" of the substitute data has been stored in the rasterizable position table 23 in S245, the intermediate code for the PDF file up to the address "600" is rasterized into page data and the substitute data is rasterized into page data in succession, as a result of which rasterization of the entire PDL file is completed (yes in S350).

Next, the above intermediate code generation process and rasterization process will be described as parallel processes with reference to the examples in FIGS. 6 and 8. While the intermediate code generation process and the rasterization process are performed in parallel, they are not synchronized. In the example shown in FIG. 6, an error occurs during the intermediate code generation process at address "650" in the intermediate code storage area 24. Here, it will be assumed that the rasterization process was completed up to address "350" in the intermediate code storage area 24. Therefore, the rasterizing progress position in the intermediate code management table 22 is currently "300."

As shown in FIG. 6, addresses "200," "300," "400," "500," and "600" in the intermediate code storage area 24 are stored in the rasterizable position table 23 as rasterizable positions. So, the rasterization process is continued up to address "600" in the intermediate code storage area 24, and the print data "A", "B", "C", "D", and "E" corresponding to each delimited region of the intermediate code storage area 24 up to address "600" is printed in the index printing location of the paper 19 corresponding to the PDF file (see FIG. 8).

In addition, the intermediate code following address "600," which is the last rasterizable address stored in the rasterizable position table 23, is replaced with prescribed substitute code and printed in the same index printing location of the paper 19 following the above print data. In the example shown in FIG. 8, the prescribed substitute code is the word "Error."

Figure 8:
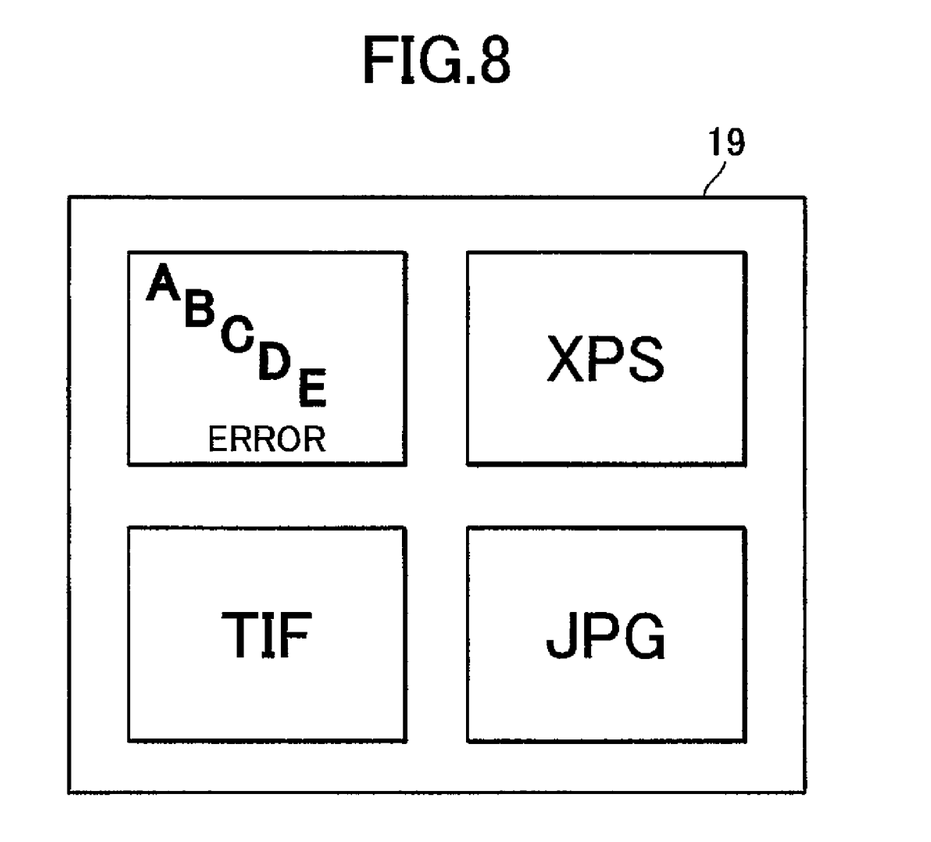
FIG. 8 shows an example of an index printing result.

Hence, although an error occurs during the intermediate code generation process in the example shown in FIGS. 6 and 8 while performing the intermediate code generation process and rasterization process in parallel, the control unit 14 replaces the intermediate data following the last rasterizable position stored in the rasterizable position table 23 with substitute data. Accordingly, the control unit 14 can print at least some of the content of the PDL file, even when an error occurs (see FIG. 8).

Further, when an error occurs while performing the intermediate code generation process and the rasterization process in parallel, the control unit 14 uses the substitute data to display an error message in part of the reduced image corresponding to the PDL file in which the error occurred. Further, at least the intermediate data following the previous rasterizable position (address "600" in the intermediate code storage area 24 in this example) that was partially converted when the error occurred is replaced with substitute data. Accordingly, it is possible to avoid an error occurring during the rasterization process (the process for creating page data) and to prevent the index printing process from being canceled.

In the conversion process of FIG. 5, every time after intermediate data is generated for one character "A", "B", "C", . . . in FIG. 6, the end address of the generated intermediate data is stored in the rasterizable position table 23 because the intermediate data for each character is one group of intermediate data, based on which page data can be created.

According to the conversion process of FIG. 5, when an error occurs while one command is being converted into intermediate data (yes in S230), the conversion process ends after the processes of S235 and S245 are executed. So, a command next to the command that has produced the error is not converted into intermediate data. Accordingly, assuming that the PDL file has characters "ABCEDFG", for example, if an error occurs when the command "F" is being converted into intermediate data as described above, the command "G" is not converted into intermediate data, and the index print is obtained as shown in FIG. 8.

The method of replacing intermediate data with substitute data when an error occurs during the intermediate code generation process is not limited to the method shown in FIGS. 6 and 8.

Figure 9:
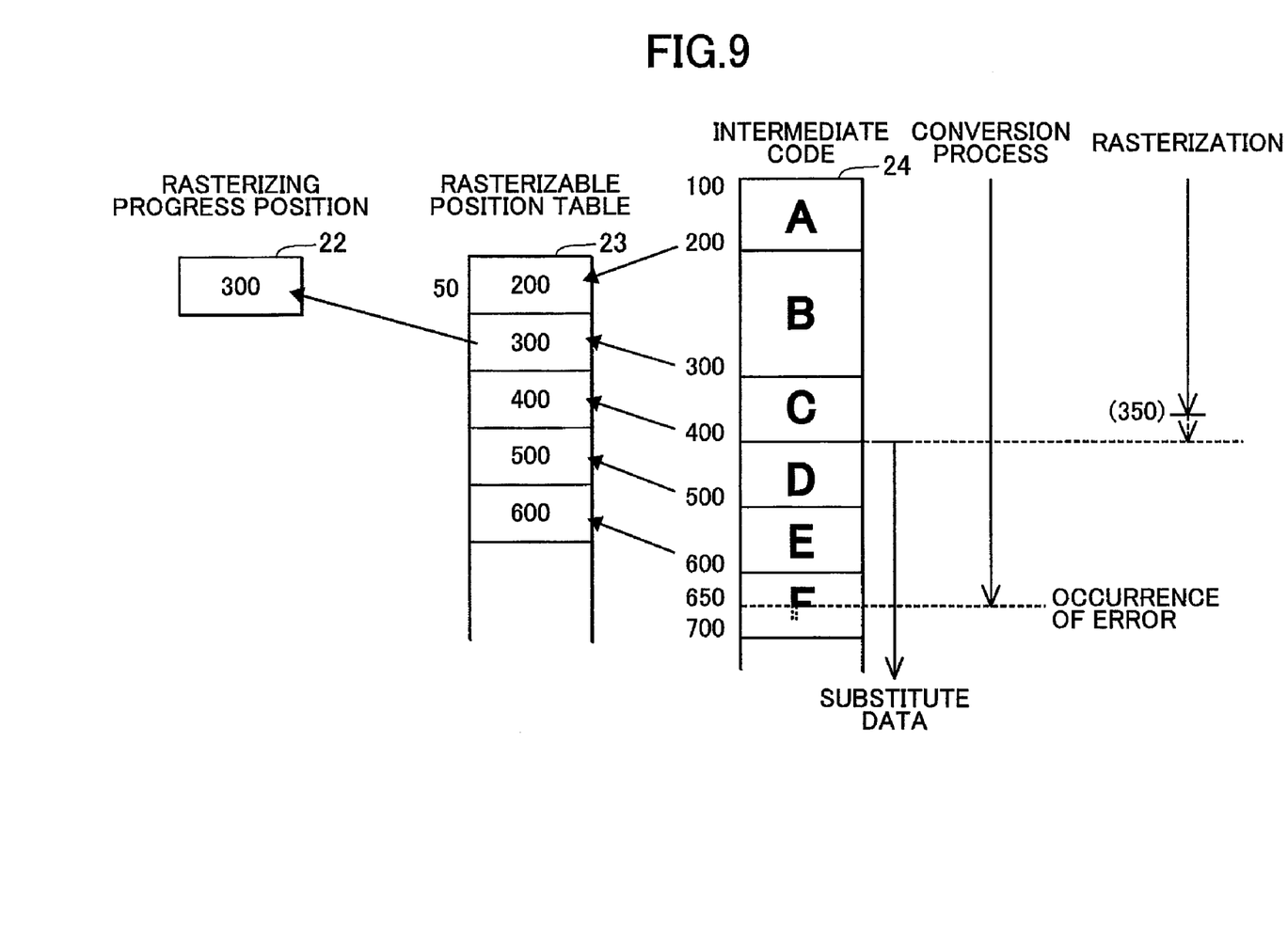
FIG. 9 is an explanatory diagram showing another example of the data structure in the internal memory when an error occurs during the intermediate code generation process.
Figure 10:
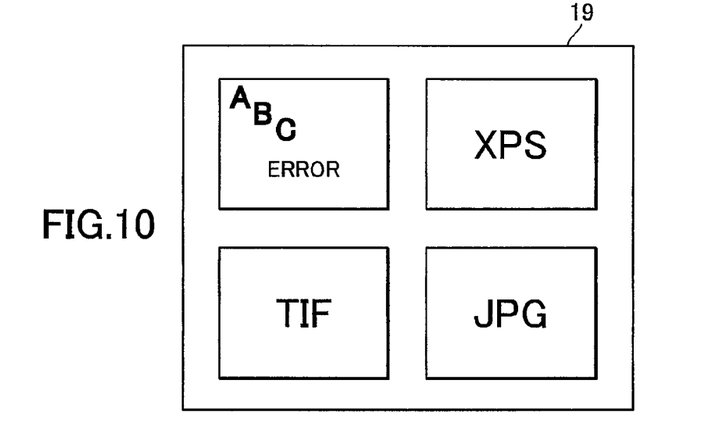
FIG. 10 shows another example of the index printing result.

As shown in the example of FIGS. 9 and 10, the control unit 14 may replace with substitute data intermediate data beginning from the rasterizable position immediately following the current rasterizing progress position stored in the intermediate code management table 22 when an error occurs. In the example shown in FIG. 9, an error occurred at address "650" of the intermediate code storage area 24. Assuming the rasterization process has been completed through the address "350," the current rasterizing progress position is "300."

At this time, the rasterizing progress position corresponds to one of the rasterizable positions, and the rasterizable position immediately following the rasterizing progress position when the error occurred is address "400" in this example. Therefore, in the example shown in FIG. 9, the intermediate code following the rasterizable position "400" is replaced with substitute data. At this time, the text "A", "B", "C", and "Error" is printed in the index printing location of the paper 19 corresponding to the PDF file, as shown in FIG. 10.

After the error occurs in the conversion process in this case, the rasterization process is only continued up to the rasterizable position (address "400") indicative of the end position of one group of intermediate data (portion between addresses "300" to "400") that has already been started being rasterized at the time of the error. Thus, this method reduces the load on the control unit 14 in the rasterization process by reducing the amount of intermediate data rasterized in the rasterization process.

Figure 11:
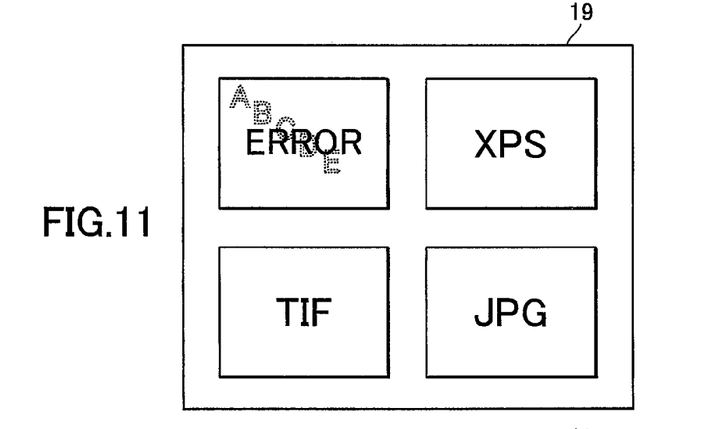
FIG. 11 shows another example of the index printing result.

Alternatively, the substitute data may be configured as making-transparent data. The making-transparent data has: drawing data indicative of how an error-indicating image showing the occurrence of an error should be drawn; and transparency degree data indicative of a transparency degree how the error-indicating image should be made transparent to allow the page data generated prior to the error occurrence to be seen through the error-indicating image as shown in FIG. 11.

In this example, the drawing data indicates that a message "Error" should be drawn in black. The transparency degree data indicates that density of the message "Error" should be decreased to 70% of the original density. In such a case, the portion of the index image ("ABCDE" in this example) that has been generated from the PDL file before an error occurred is printed as a background image at a density of 30% of the original density of the index image, and the message "Error" is printed over the background image in black color at a density of 70% of the original density of the message.

In this case, the portion of the index image generated from the PDL file before an error occurred can be visibly printed, while a message such as "Error" generated from the substitute data can be printed in relatively large letters. Accordingly, the user can view the maximum possible content of a file that produced an error, while easily being able to recognize that an error occurred.

Figure 12:
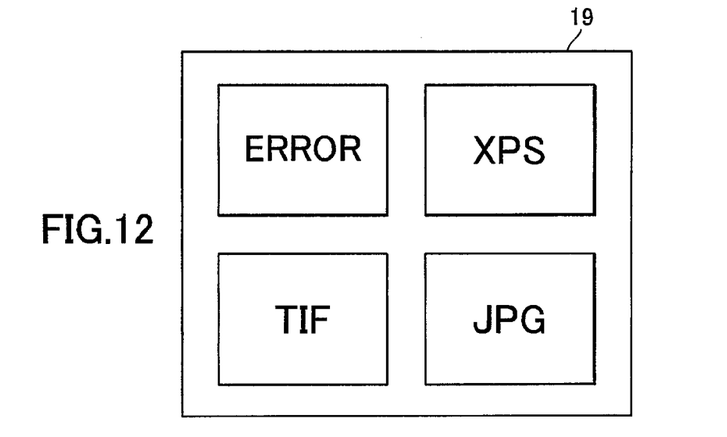
FIG. 12 shows another example of the index printing result.

Alternatively, if an error occurs when processing a PDL file (print data), the control unit 14 may overwrite the entire printing region for the index image corresponding to the PDL file with the substitute data, as illustrated in FIG. 12. This method can produce the same output results, regardless of when the error occurred during the intermediate code generation process.

While the message "Error" is printed on the paper 19 based on the substitute data in the above examples, the data printed based on the substitute data may be other text, such as "Unsupported format," "Error: 01," or the like, or may be an icon or symbol denoting an error, for example. Further, the method of replacing intermediate data with substitute data may be selected to suit any format conditions or the like of the PDL files.

According to the embodiment described above, the printer 10 can perform the intermediate code generation process (conversion process) and the rasterization process (page data creation process) in parallel, while showing an error based on substitute data in a portion of a reduced image corresponding to the PDL file (print data) in which the error occurred. The printer 10 can also replace with substitute data at least intermediate data that follows the rasterizable position and that was partially converted when the error occurred with the substitute data, thereby avoiding an error from occurring in the page data creation process (rasterization process) and preventing the cancellation of the index printing process. In other words, the printer 10 can create intermediate data and create page data in parallel, while accurately indicating in which PDL file an error occurred.

While the invention has been described in detail with reference to the specific embodiment thereof, it would be apparent to those skilled in the art that many modifications and variations may be made therein without departing from the spirit of the invention, the scope of which is defined by the attached claims.

First Modification

In the embodiment described above, a process to replace the intermediate code with substitute data is executed in S235 of the intermediate code generation process shown in FIG. 5 if an error occurs during the intermediate code generation process. However, the process to replace intermediate code with substitute data may be executed in the rasterization process. In this case, the rasterization process of FIG. 7 is modified as shown in FIG. 13.

In this case, the conversion process of FIG. 5 is also modified as described below.

That is, when an error occurs during the intermediate code generation process (conversion process) of FIG. 5, in S235 the control unit 14 writes an error flag in the intermediate code management table 22 over the current rasterizing progress position, rather than replacing intermediate code with substitute data as described in the embodiment.

Figure 13:
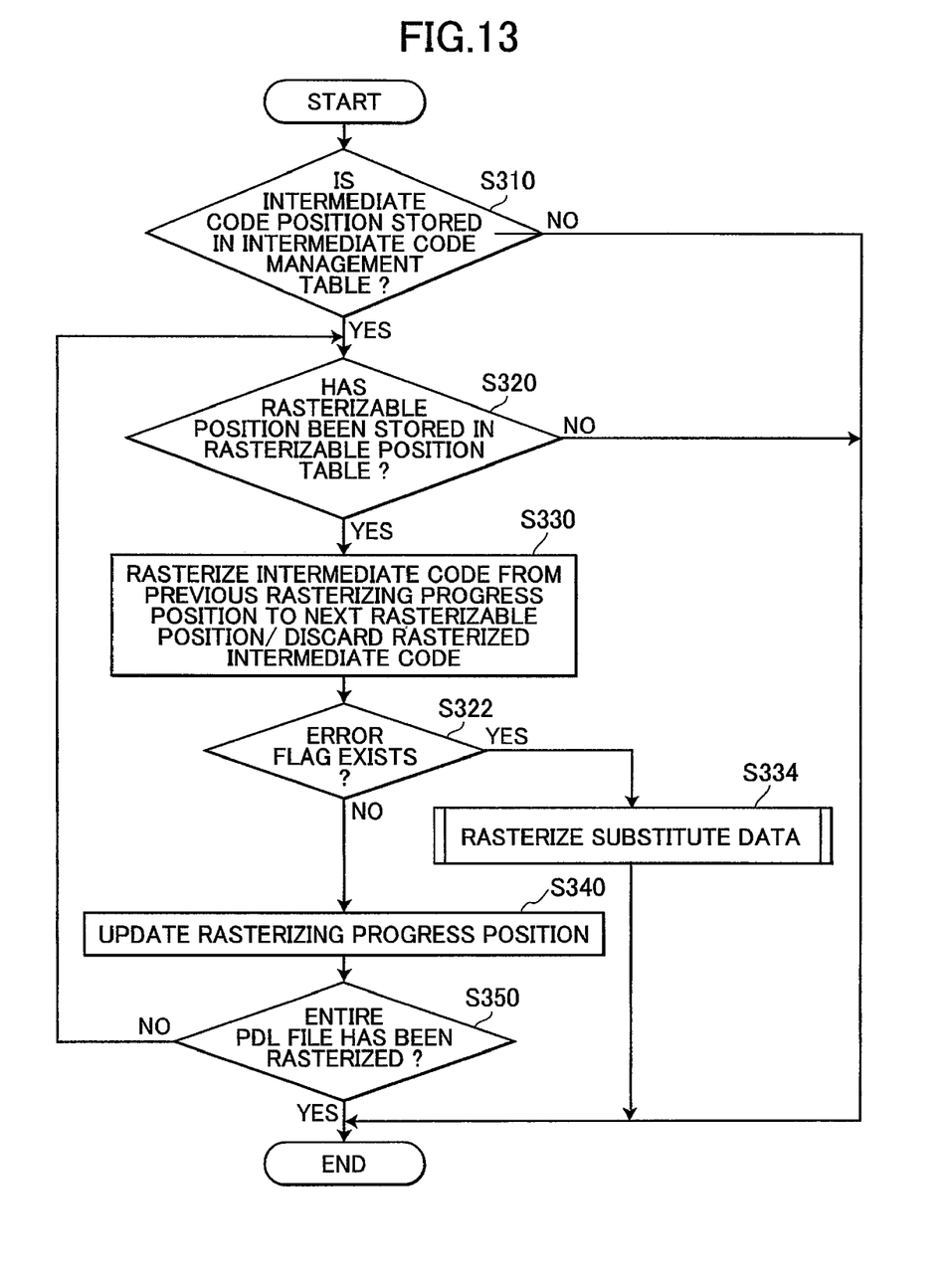
FIG. 13 is a flowchart showing the steps in a modification of the rasterization process.

Therefore, in S322 of FIG. 13, the control unit 14 determines whether an error flag exists in the intermediate code management table 22 every time after creating page data based on intermediate code up to one rasterizable position. If the control unit 14 determines that an error flag exists (S322: YES), in S334 the printing unit 11 performs a process to directly rasterize substitute data, rather than performing a process to replace intermediate code with substitute data and then to rasterize the substitute data. The substitute code may be provided at a prescribed storage location in the printer 10. When the rasterization of the substitute data is completed, the control unit 14 ends the entire process of FIG. 13.

More specifically, when the control unit 14 determines that an error flag exists (S322: YES), the control unit 14 selects a rasterizable position, to which the control unit 14 will continue the rasterization process to the intermediate code (file data), rasterizes the intermediate code up to the selected rasterizable position, and subsequently rasterizes the substitute data after completing rasterization of the intermediate code.

According to this modification, therefore, an index print of FIG. 8 can be obtained by using the flow the same as that described above with reference to FIG. 6, and an index print of FIG. 10 can be obtained by using the flow the same as that described above with reference to FIG. 9.

Now assume that similarly to the example described above with reference to FIGS. 6 and 9, an error occurs when the character "F" has been partially converted into intermediate code up to address "650" in S220 of the conversion process of FIG. 5 and the intermediate code for the character "C" has been partially rasterized in S330 in the rasterization process of FIG. 13 from the rasterizing progress position 300 to the address "350". So, in S235 of the conversion process of FIG. 5, an error flag is stored in the intermediate code management table 22.

In this case, in the rasterization process of FIG. 13, in S330, the rasterizing of the intermediate code for character "C" is continued up to the address "400". When the rasterizing of the intermediate code for character "C" is completed, the program proceeds to S322, wherein the intermediate code management table 22 is checked. In this case, an error flag exists in the intermediate code management table 22 (Yes in S322), and therefore the program proceeds to S334.

In order to obtain an index printing result of FIG. 8, the intermediate data is desired to be rasterized up to a desired rasterizable position "600". Because rasterization has not yet been proceeded up to "600", in S334, the control unit 14 rasterizes the intermediate code from the rasterizable position "400" to the desired rasterizable position "600", and thereafter rasterizes substitute code stored in the prescribed storage location. As a result, an index printing image of FIG. 8 is obtained.

Instead, in order to obtain an index printing result of FIG. 10, the intermediate data is desired to be rasterized up to a desired rasterizable position "400". Because rasterization has already been proceeded up to "400", in S334, the control unit 14 rasterizes substitute code stored in the prescribed storage location, without rasterizing the intermediate code from the rasterizable position "400" to "600". As a result, an index printing image of FIG. 10 is obtained.

According to this method, when performing the rasterization process to create page data, the control unit 14 can detect when an error has occurred in the intermediate code generation process based on the error flag. Hence, this method can reduce the discrepancy in time at which the conversion process and page data creation process are performed in parallel, thereby improving the speed of the printing process. Further, by prestoring common substitute data that is to be used for a plurality of types of print data, the printer 10 can create page data based on the common substitute data after an error occurs, thereby simplifying control related to the error process. Further, by reducing the amount of intermediate data to be processed, it is possible to reduce the load on the printer 10 incurred during the page data creation process (rasterization process).

Second Modification

In the above-described embodiment and first modification, the rasterizable position table 23 is configured so as to be capable of storing therein a plurality of rasterizable positions in succession as the commands are converted into intermediate codes one by one. Every time when one command in one PDL file is converted into an intermediate code, a corresponding rasterizable address is added in the rasterizable position table 23. So, if commands are included in one PDL file, rasterizable addresses are set in the rasterizable position table 23 as shown in FIGS. 6 and 9.

However, the rasterizable position table 23 may be configured so as to be capable of storing only one rasterizable address therein in correspondence with each PDL file. In such a case, every time when one command in one PDL file is converted into an intermediate code, a corresponding rasterizable address is written over a previous rasterizable position in the rasterizable position table 23. For example, in the example of FIG. 6, when conversion of the command for letter A into the intermediate code is completed without occurring any error (no in S230), the end position "200" of the intermediate code is stored in the rasterizable position table 23 in S240 in the same manner as in the embodiment. When conversion of the command for letter B into the intermediate code is completed without occurring any error (no in S230), the end position "300" of the intermediate code is stored in the rasterizable position table 23 in S240 as being written over the previous rasterizable position "200". Thus, the rasterizable position is updated from "200" in succession through "300", "400", "500", to "600" while the routine of S210-S250 are executed. In this modification, similarly to the above-described embodiment, the rasterizable position is frequently updated, and therefore a small amount of intermediate data can be replaced with substitute data when an error occurs.

In this modification, the rasterizing progress position need not be stored in the intermediate code management table 22. Instead, the rasterizer stores the rasterizing progress position therein. In order to finely control the timing when the intermediate data should be replaced with the substitute code, the rasterizing progress position should be disclosed outside the rasterizer so that the intermediate code generating process can refer to up to where the rasterization has been completed. However, if it is unnecessary to finely control the timing when the intermediate data should be replaced with the substitute code, the rasterizing progress position does not need to be disclosed outside the rasterizer. In this modification, because only a single rasterizable position is stored in the rasterizable position table 23, the intermediate code storage area 24 for each PDL file cannot be divided into more than one region. So, the intermediate code storage area 24 for each PDL file has to be defined in the internal memory 20 as a continuous region, contrarily to the above-described embodiment and first modification.

Still in the present modification, the rasterizer can perform the rasterizing process of FIG. 7 in the same manner as in the above-described embodiment except that the rasterizing progress position is not disclosed outside the rasterizer. That is, in S330 and S340, the rasterizing progress position that is stored inside the rasterizer is used.

Similarly, the rasterizer can perform the rasterizing process of FIG. 13 in the same manner as in the above-described first modification except that the rasterizing progress position is not disclosed outside the rasterizer. In this case, in S322, the control unit 14 judges whether an error flag exists after completing rasterizing intermediate data up to the rasterizable position currently stored in the rasterizable position table 23. When an error flag exists (yes in S322), in S334, the control unit 14 fails to rasterize the intermediate code following the rasterizable position, but rasterizes the substitute code.

Third Modification

In the second modification, the single rasterizable position is updated every time when one group of intermediate data that is rasterizable is generated. However, the single rasterizable position may not be updated. For example, if only one set of command is contained in one PDL file or if the PDL data is JPEG data, it is unnecessary to update the rasterizable position.

In the present modification, after a first set of intermediate data, which can be rasterized to create page data, is generated for a PDL file being processed, the rasterizable position is stored in the rasterizable position table 23 for the subject PDL file.

Still in this case, the printer 10 can perform the intermediate code generation process and the rasterization process in parallel based on the single rasterizable position. If an error occurs during the intermediate code generation process, the printer 10 can prevent an error from occurring in the page data creation process (rasterization process) and thus can prevent cancellation of the index printing process.

Fourth Modification

While the USB memory 17 is used as an example of storing PDL data in the embodiment, the USB memory 17 may be replaced with a memory card such as a CompactFlash (registered trademark) card, a SmartMedia (registered trademark) card, or a Memory Stick (registered trademark). The PDL data may be stored in the internal memory 20 built into the printer 10, for example. Further, the index printing of FIG. 4 may be applied not only to the direct printing process but also to the PC printing process in which the PDL data is stored in a hard disk or the like provided in a host computer connected to the printer 10.

What is claimed is:
1. An image-forming device comprising:
   a processor;
   a memory having machine readable instructions stored thereon that, when executed by the processor, perform steps including
   performing a conversion process to convert a plurality of sets of print data, which are of differing formats from one another, into intermediate data of a common for- mat, the conversion process converting each set of print data into a corresponding set of intermediate data;

creating page data from the intermediate data in parallel with the conversion process;

causing a printing unit to perform an index printing operation based on page data created by the creating step;

storing in a storing unit at least one page data creatable range delimiter for the intermediate data by which the creating step creates the page data from the intermediate data, the one page data creatable range delimiter being stored in the storing unit after the conversion process converts at least a part of one set of print data of one format into a set of intermediate data, from which page data is creatable;

performing a replacement process to replace at least the intermediate data Positioned after the page data creatable range delimiter in the print data with substitute data when an error occurs in the print data during the conversion process; and updating the current page data creatable range delimiter to the next page data creatable range delimiter after the conversion process has converted the print data to intermediate data up to the next page data creatable range delimiter;

wherein the storing step includes storing each of the plurality of page data creatable range delimiters while the page data creatable range delimiters are sequentially updated;

the creating step includes sequentially creating the page data based on the plurality of page data creatable range delimiters and storing the page data creatable range delimiter corresponding to the created page data in the storing unit as a data creation progress delimiter; and the replacing step includes replacing with the substitute data the intermediate data following the page data creatable range delimiter that is stored immediately after the page data creatable range delimiter that corresponds to the data creation progress delimiter.

2. An image-forming device according to claim 1, wherein the step of performing the conversion process includes storing an error flag in the storing unit when an error occurs during the conversion process;

the step of creating includes creating the page data from the intermediate data based on each page data creatable range delimiter; and the step of performing the replacement process includes determining whether the error flag exists every time after the creating step creates the page data up to one page data creatable range delimiter, and executing the replacement process when determining that the error flag exists.

3. An image-forming device according to claim 2, wherein the step of performing the replacement process includes:

determining whether the error flag exists every time after the step of creating has completed processing intermediate data up to one page data creatable range delimiter; and controlling the creating step to create page data from the intermediate data up to a desired page data creatable range delimiter if page data has not yet been created from the intermediate data prior to the desired page data creatable range delimiter, to fail to create page data based on the intermediate data following the desired page data creatable range delimiter, and to create page data based on the substitute data.

4. An image-forming device according to claim 1, wherein the substitute data is making-transparent data that makes the page data to be seen through the substitute data.

5. An image-forming device according to claim 1, wherein the step of performing the replacement process includes overwriting with the substitute data an entire printing region for an index image corresponding to the print data that has produced an error.

6. An image-forming device according to claim 1, wherein the substitute data is data indicating that an error has occurred.

7. An image-forming device according to claim 1, wherein the memory further has machine readable instructions stored thereon that, when executed by the processor, perform a step of discarding the intermediate data, from which page data has already been created.

8. An image-forming device according to claim 1, wherein the memory further has machine readable instructions stored thereon that, when executed by the processor, perform a step of storing the plurality of sets of print data in another storing unit.

9. An image-forming device comprising:

a processor;

a memory having machine readable instructions stored thereon that, when executed by the processor, perform steps including performing a conversion process to convert a plurality of sets of print data, which are of differing formats from one another, into intermediate data of a common format, the conversion process converting each set of print data into a corresponding set of intermediate data;

creating page data from the intermediate data in parallel with the conversion process;

causing a printing unit to perform an index printing operation based on page data created by the creating step;

storing in a storing unit at least one page data creatable range delimiter for the intermediate data by which the creating step creates the page data from the intermediate data, the one page data creatable range delimiter being stored in the storing unit after the conversion process converts at least a part of one set of print data of one format into a set of intermediate data, from which page data is creatable;

performing a replacement process to replace at least the intermediate data positioned after the page data creatable range delimiter in the print data with substitute data when an error occurs in the print data during the conversion process; and updating the current page data creatable range delimiter to the next page data creatable range delimiter after the conversion process has converted the print data to intermediate data up to the next page data creatable range delimiter;

wherein the storing unit stores each of the plurality of page data creatable range delimiters while the delimiters are sequentially updated; and the replacing unit replaces with the substitute data the intermediate data following the page data creatable range delimiter that is stored last among the plurality of page data creatable range delimiters.

10. An image-forming device according to claim 9, wherein the substitute data is making-transparent data that makes the page data to be seen through the substitute data.

11. An image-forming device according to claim 9, wherein the step of performing the replacement process includes overwriting with the substitute data an entire printing region for an index image corresponding to the print data that has produced an error.

12. An image-forming device according to claim 9, wherein the substitute data is data indicating that an error has occurred.

13. An image-forming device according to claim 9, wherein the memory further has machine readable instructions stored thereon that, when executed by the processor, perform a step of discarding the intermediate data, from which page data has already been created.

14. An image-forming device according to claim 9 wherein the memory further has machine readable instructions stored thereon that, when executed by the processor, perform a step of storing the plurality of sets of print data in another storing unit.

15. An image-forming device comprising:
   a processor;
   a memory having machine readable instructions stored thereon that, when executed by the processor, perform steps including
      performing a conversion process to convert a plurality of sets of print data, which are of differing formats from one another, into intermediate data of a common format, the conversion process converting each set of print data into a corresponding set of intermediate data;
      creating page data from the intermediate data in parallel with the conversion process;
      causing a printing unit to perform an index printing operation based on page data created by the creating step;
      storing in a storing unit at least one page data creatable range delimiter for the intermediate data by which the creating step creates the page data from the intermediate data, the one page data creatable range delimiter being stored in the storing unit after the conversion process converts at least a part of one set of print data of one format into a set of intermediate data, from which page data is creatable;
      performing a replacement process to replace at least the intermediate data positioned after the page data creatable range delimiter in the print data with substitute data when an error occurs in the print data during the conversion process; and
      updating the current page data creatable range delimiter to the next page data creatable range delimiter after the conversion process has converted the print data to intermediate data up to the next page data creatable range delimiter;
   wherein the converting unit stores an error flag in the storing unit when an error occurs during the conversion process;
   the creating unit creates the page data from the intermediate data up to the page data creatable range delimiter; and
   the replacing unit determines whether the error flag exists after the creating unit has completed processing intermediate data up to the page data creatable range delimiter, and when determining that the error flag exists, the replacing unit executes the replacement process to replace at least the intermediate data positioned after the page data creatable range delimiter in the print data with substitute data.

16. An image-forming device according to claim 15, wherein the step of performing the replacement process includes:
   determining whether the error flag exists after the step of creating has completed processing intermediate data up to the page data creatable range delimiter; and
   when the error flag judging unit determines that the error flag exists, controlling the creating step to fail to create page data based on the intermediate data following the page data creatable range delimiter and to create page data based on the substitute data.

17. An image-forming device according to claim 15, wherein the substitute data is making-transparent data that makes the page data to be seen through the substitute data.

18. An image-forming device according to claim 15, wherein the step of performing the replacement process includes overwriting with the substitute data an entire printing region for an index image corresponding to the print data that has produced an error.

19. An image-forming device according to claim 15, wherein the substitute data is data indicating that an error has occurred.

20. An image-forming device according to claim 15, wherein the memory further has machine readable instructions stored thereon that, when executed by the processor, perform a step of discarding the intermediate data, from which page data has already been created.

21. An image-forming device according to claim 15, wherein the memory further has machine readable instructions stored thereon that, when executed by the processor, perform a step of storing the plurality of sets of print data in another storing unit.

* * * * *